US012774853B2

(12) United States Patent
Peterman

(10) Patent No.: US 12,774,853 B2
(45) Date of Patent: Oct. 27, 2026

(54) ROTARY FURNACE DIRECTIONAL FLUID CONDUIT HEAT CONTROL SYSTEM

(71) Applicant: GPRE IP, LLC, St. Louis, MO (US)

(72) Inventor: John M. Peterman, Troy, MO (US)

(73) Assignee: GPRE IP, LLC, St. Louis, MO (US)

( * ) Notice: Subject to any disclaimer, the term of this patent is extended or adjusted under 35 U.S.C. 154(b) by 308 days.

(21) Appl. No.: 18/667,053

(22) Filed: May 17, 2024

(65) Prior Publication Data

US 2024/0384933 A1 Nov. 21, 2024

Related U.S. Application Data

(60) Provisional application No. 63/467,640, filed on May 19, 2023.

(51) Int. Cl.

| | |
|---|---|
| ***F27B 7/36*** | (2006.01) |
| ***F27B 7/10*** | (2006.01) |
| ***F27D 17/10*** | (2025.01) |
| *F27D 19/00* | (2006.01) |

(52) U.S. Cl.

CPC ................ *F27B 7/362* (2013.01); *F27B 7/10* (2013.01); *F27D 17/10* (2025.01); *F27B 2007/365* (2013.01); *F27D 2019/0003* (2013.01); *F27D 2019/0018* (2013.01); *F27D 2019/0068* (2013.01)

(58) Field of Classification Search

CPC ...... F27B 7/36; F27B 7/362; F27B 2007/365; F27B 2007/367

See application file for complete search history.

(56) References Cited

U.S. PATENT DOCUMENTS

| | | | | |
|---|---|---|---|---|
| 3,808,988 A * | 5/1974 | Sugano | F23G 5/20 | 432/116 |
| 5,632,616 A * | 5/1997 | Tutt | C04B 7/364 | 432/105 |
| 6,652,802 B2 * | 11/2003 | Sherwood | C21B 13/085 | 266/176 |
| 9,181,488 B2 * | 11/2015 | Marszal | F27B 7/20 | |

FOREIGN PATENT DOCUMENTS

| | | | |
|---|---|---|---|
| CN | 112066718 A * | 12/2020 | F27B 7/362 |
| GB | 2104636 A * | 3/1983 | F27B 7/34 |
| WO | WO-2023180199 A1 * | 9/2023 | F27D 99/0033 |

* cited by examiner

*Primary Examiner* — Gregory A Wilson

(74) *Attorney, Agent, or Firm* — Harness, Dickey & Pierce, P.L.C.

(57) ABSTRACT

A directional fluid heat control system for a high temperature kiln with a process zone. The system includes two rigid, coaxially aligned tubes positioned in the kiln. One tube rotates inside the other. One tube has a series of longitudinal openings, while the other has a series of helically arranged openings. Rotating one tube selectively aligns an opening from that tube with an opening in the other. Further rotation aligns different such pairs of openings with different longitudinal orientations in the kiln. The aligned openings release pressurized fluid from the inner tube into desired locations in the kiln's process zone.

35 Claims, 8 Drawing Sheets

ROTARY FURNACE DIRECTIONAL FLUID CONDUIT HEAT CONTROL SYSTEM

CROSS REFERENCE TO RELATED APPLICATIONS

This application derives and claims priority from U.S. provisional application 63/467,640, filed May 19, 2023, which provisional application is incorporated herein by reference.

STATEMENT REGARDING FEDERALLY SPONSORED RESEARCH OR DEVELOPMENT

Not applicable.

BACKGROUND OF THE INVENTION

This invention relates principally to a system for controlling the heat profile in a high temperature furnace, and more particularly to a system for the controlled injection of a fluid, such as for example the injection of a gas, and even more particularly hot air, into one or more desired zones of a high temperature furnace, such as for example a scrap Aluminum delacquering (i.e., decoating) rotary kiln furnace, to modulate the heat and/or temperature profile(s) in the kiln.

It has for some time been a standard practice to recycle scrap metals, and in particular scrap Aluminum. Various furnace and kiln systems exist that are designed to recycle and recover aluminum from various sources of scrap, such as used beverage cans ("UBC"), siding, windows and door frames, etc. One of the first steps in these processes is to use a rotary kiln to volatize and remove the paints, oils, and other surface materials (i.e., volatile organic compounds or "VOC's") on the coated scrap Aluminum (i.e. "feed material"). This is commonly known in the industry as "decoating" or "delacquering." Delacquering is typically performed in a chamber with an atmosphere having reduced Oxygen levels and with temperatures in excess of 900 degrees Fahrenheit. However, the temperature range at which the paints and oils and other surface materials are released from the aluminum scrap in the form of unburned volatile gases typically ranges between 450 and 600 degrees Fahrenheit, which is generally known as the "volatilization point" or "VOL." The volatizing furnace tube may be run as hot as 900-1000 degrees Fahrenheit to ensure that sufficient heat is transferred throughout the scrap load to achieve an internal temperature of at least 450 degrees Fahrenheit.

One of the difficulties encountered in operating a delacquering system having a rotary kiln is control over the temperature and heat in the kiln itself as the scrap metal is moving through the kiln.

Unfortunately, fires can occur in the kiln when the feed material reaches the volatilization point too rapidly and the feed material begins to rapidly oxidize and generate its own heat, leading to a high temperature excursion (i.e. "Overtemp Event"). These Overtemp Events can occur at different positions along the length of the feed material in the kiln, and may be affected by such variables as the size of the feed material put into the kiln, the moisture content of the feed material, the volume of the feed material and the feed rate, the composition of the feed material, and the cleanliness of feed material. Applicant has learned through tests, utilizing wireless high temperature thermocouples placed in the kiln, that such events can arise in as little as 10 minutes of operation. Further, Applicant has learned that controlling the heat and moisture levels in the kiln can regulate and prevent such Overtemp Events. A fire in a rotary aluminum kiln can require a costly shut-down, will likely destroy the feed material, and can damage the kiln and other associated equipment.

It would therefore be desirable to have an apparatus or system for a scrap metal recycling rotary kiln furnace, or other high temperature furnaces, that could provide further controllable regulation of the temperature in selectable zones of the furnace kiln to either better control operational temperatures and heat, or minimize the risk of an Overtemp Event. As will become evident in this disclosure, the present invention provides such benefits over the existing art.

BRIEF DESCRIPTION OF THE DRAWINGS

The illustrative embodiments of the present invention are shown in the following drawings which form a part of the specification.

Corresponding reference s indicate corresponding parts throughout the several views of the drawings.

DETAILED DESCRIPTION

Figure 1:
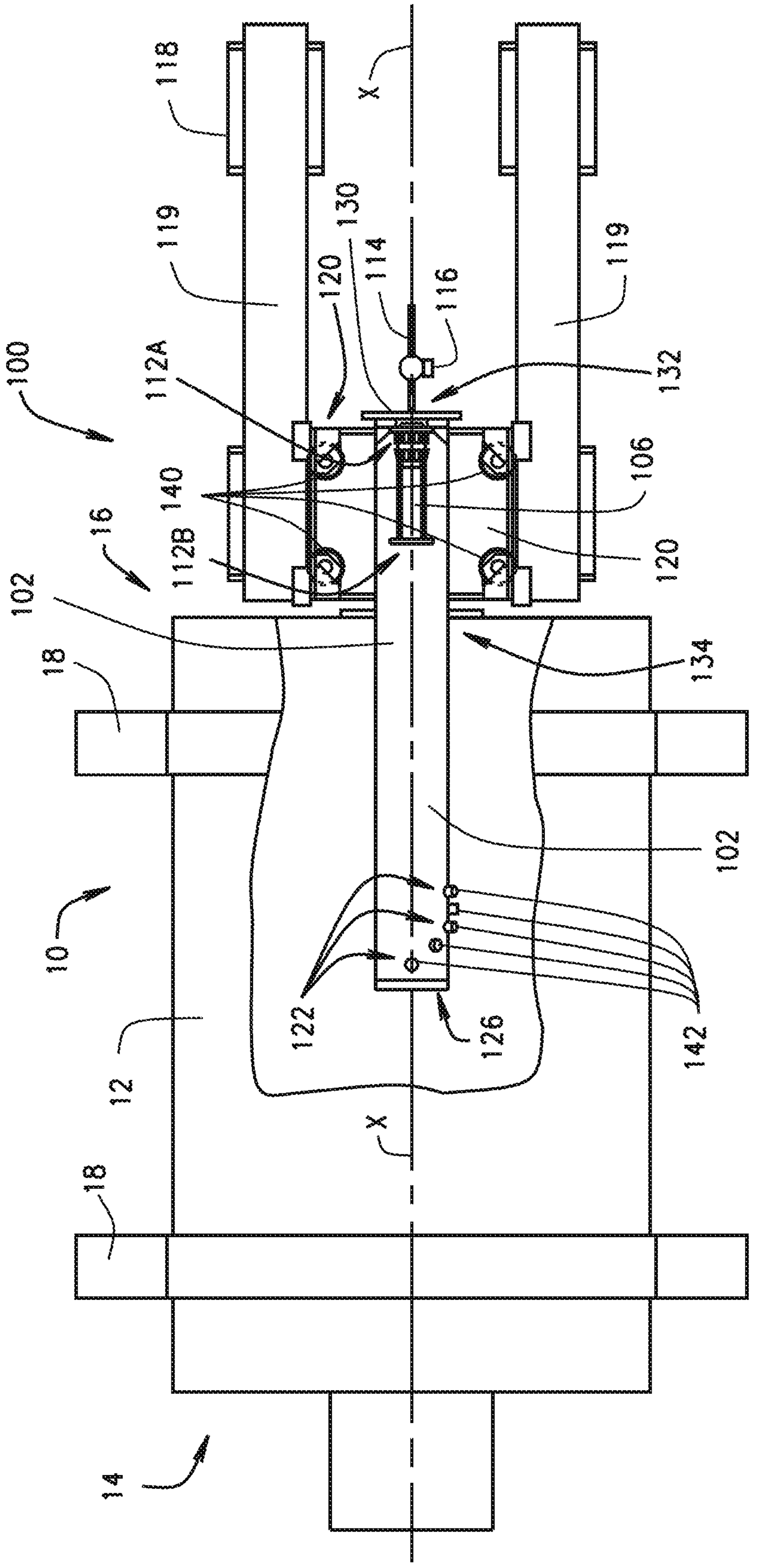
FIG. 1 is a partial cut-away top view of a first configuration of the directional fluid conduit heat control system of the present disclosure, showing the tubes of the system inserted into one end of a rotary kiln.
Figure 2:
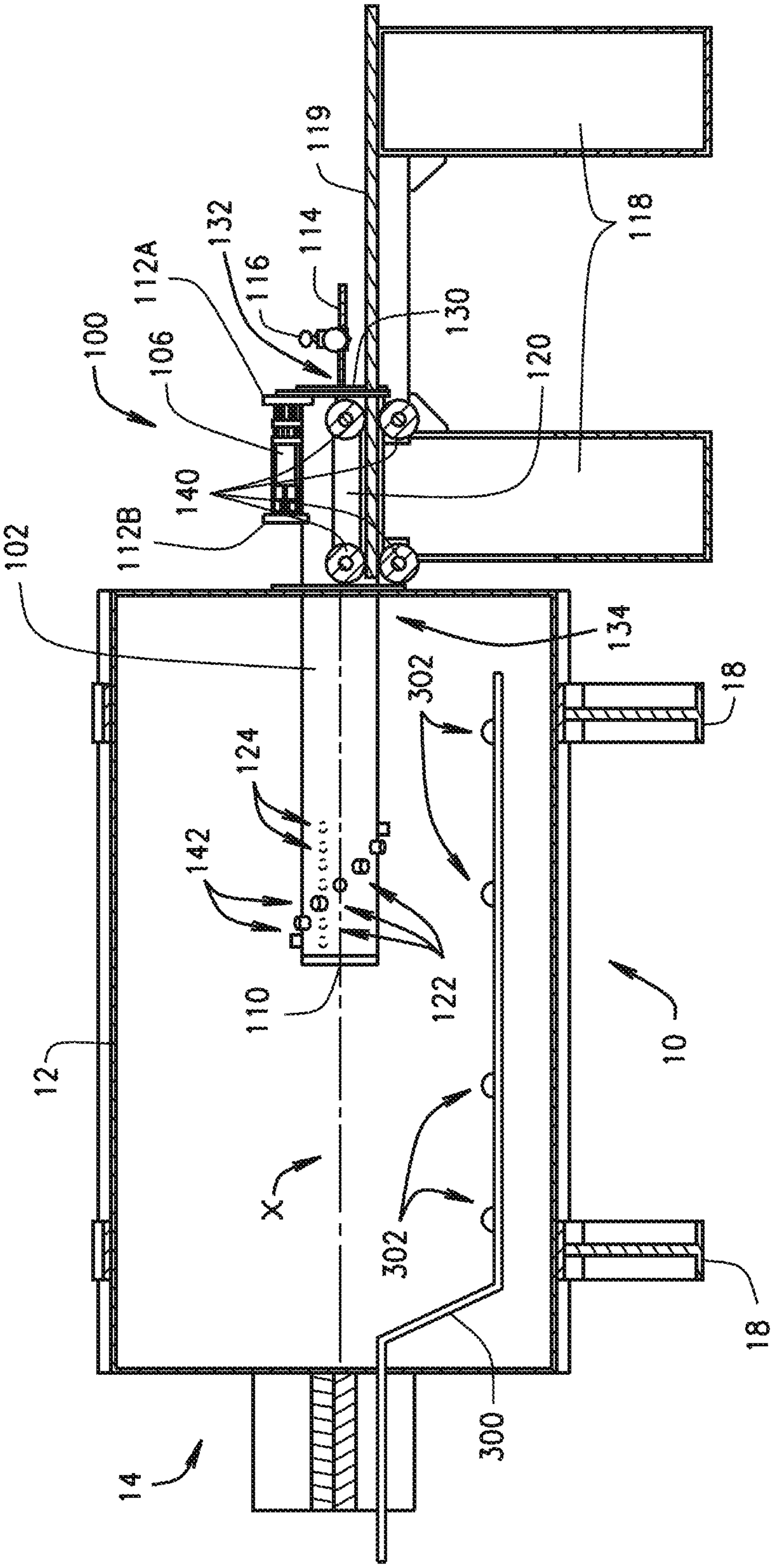
FIG. 2 is a partial phantom side view of FIG. 1, with the outer tube of the heat control system rotated to a first position juxtaposed against phantom images of the bores in the inner tube inside the outer tube.
Figure 3:
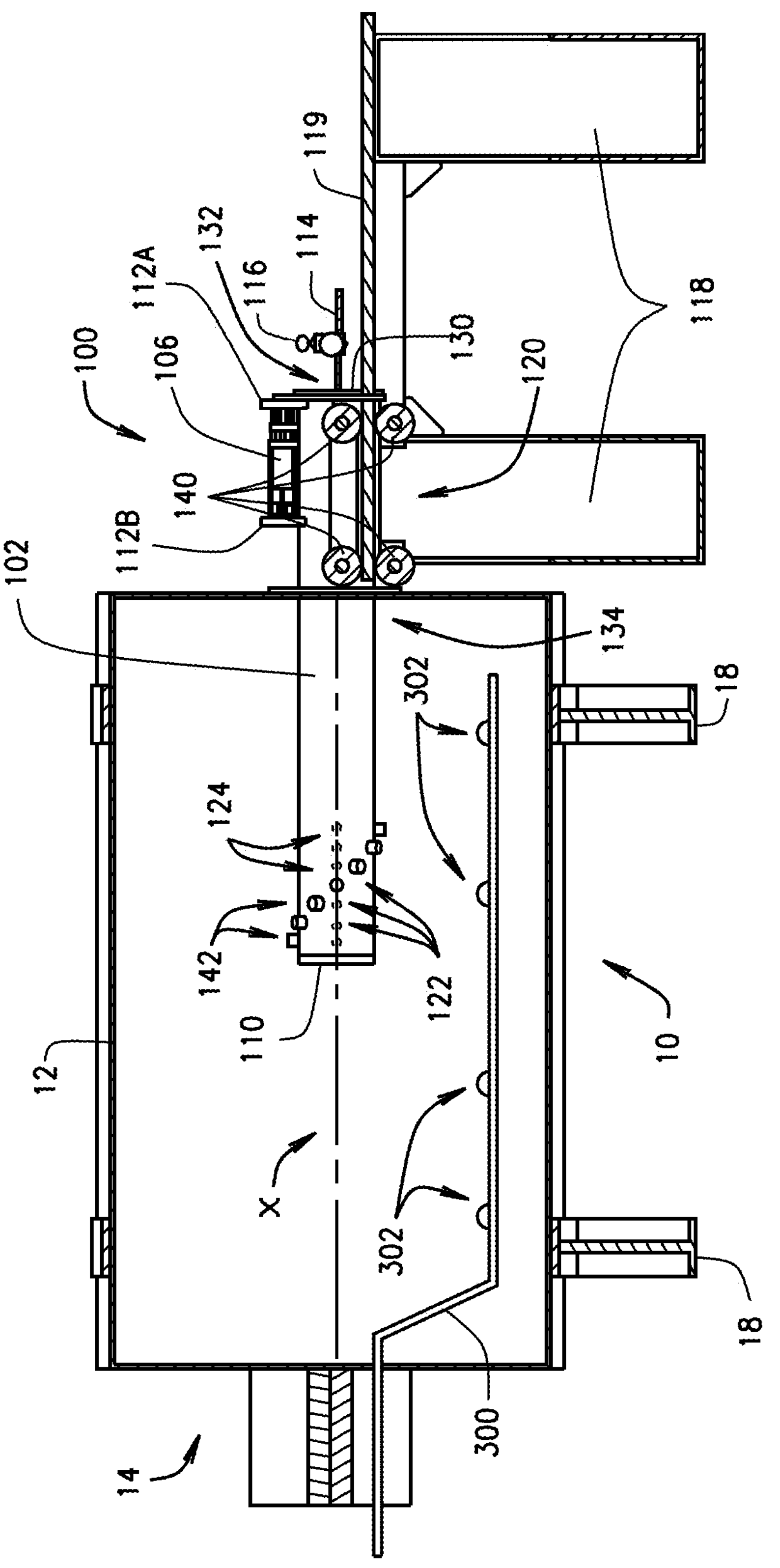
FIG. 3 is a partial phantom side view of FIG. 1, with the outer tube of the heat control system rotated to a second position juxtaposed against phantom images of the bores in the inner tube inside the outer tube.
Figure 4:
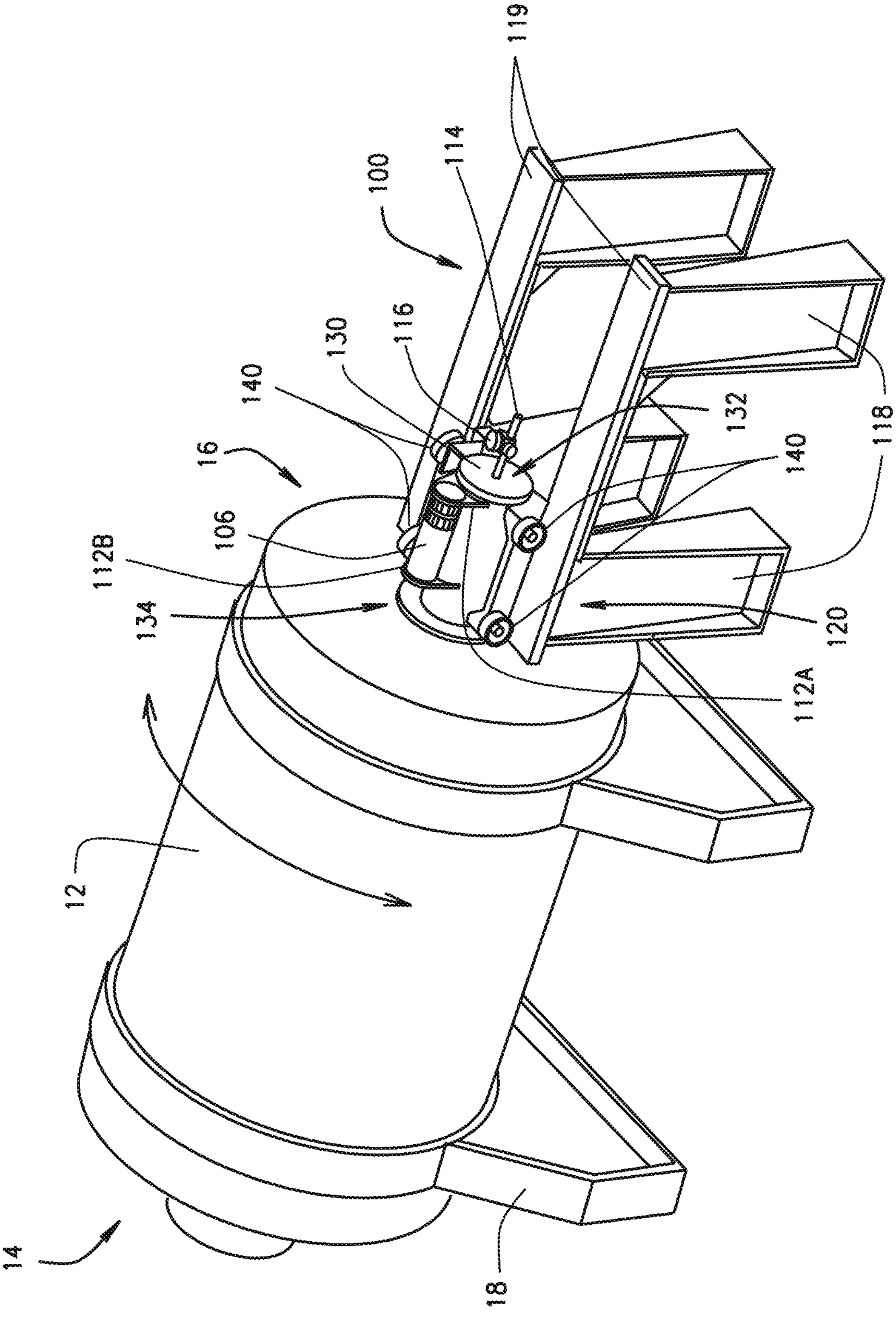
FIG. 4 is a perspective view of the rotary kiln of FIG. 1 with the directional fluid conduit heat control system of the present disclosure partially inserted into one end of the kiln.

In referring to the drawings, an embodiment of a representative rotary furnace 10 is shown generally in FIGS. 1-4, where the novel directional fluid conduit heat control system 100 of the present invention is depicted by way of example as associated with the furnace 10. Although the representative system 100 as disclosed is configured to operate using a pressurized gas, the system 100 can alternatively be configured to operate using various fluids, such as for example water, various coolants and various oils. The representative rotary furnace 10 includes a cylindrical rotary kiln 12 with a central axis X, an inlet end 14, an outlet end 16, and two circular steel support braces 18 that each include a steel ring which houses a set of bushings or bearings to support and secure the kiln 12 in a desired position while allowing the kiln 12 to rotate about its central axis X. A drive motor (not shown) operatively rotates the kiln 12. Although the kiln 12 and the axis X are shown as being horizontally oriented, the kiln 12 can be oriented with the inlet end 14 higher than the outlet end 16, such that the axis X is directed downward from the inlet end 14 to the outlet end 16. Alternatively, the kiln 12 can be oriented with the inlet end 14 lower than the outlet end 16, such that the axis X is directed upward from the inlet end 14 to the outlet end 16. Generally, process material, such as scrap aluminum, is placed in the kiln 12 at the inlet end 14, and travels the length of the kiln 12 where it is removed at the outlet end 16 of the kiln 12. Heat, generally in the form of hot gasses, is provided to the kiln 12 from outlet end 16 of the kiln 12. However, the furnace 10 can be configured to have the hot gasses provided to the kiln 12 from the inlet end 14.

The directional fluid conduit heat control system 100 includes a cylindrical outer conduit or tube 102, a cylindrical inner conduit or tube 104, an electric drive motor 106, a first rotary shaft bushing 108, a second rotary shaft bushing 110, a pair of motor mounting brackets 112A and 112B, a gas supply line 114, an automated gas regulator 116, a steel stand 118, a set of horizontal steel rails 119 attached to the top of the stand 118, and a steel bed or cart 120 that is operatively mounted to the rails 119.

Figure 5:
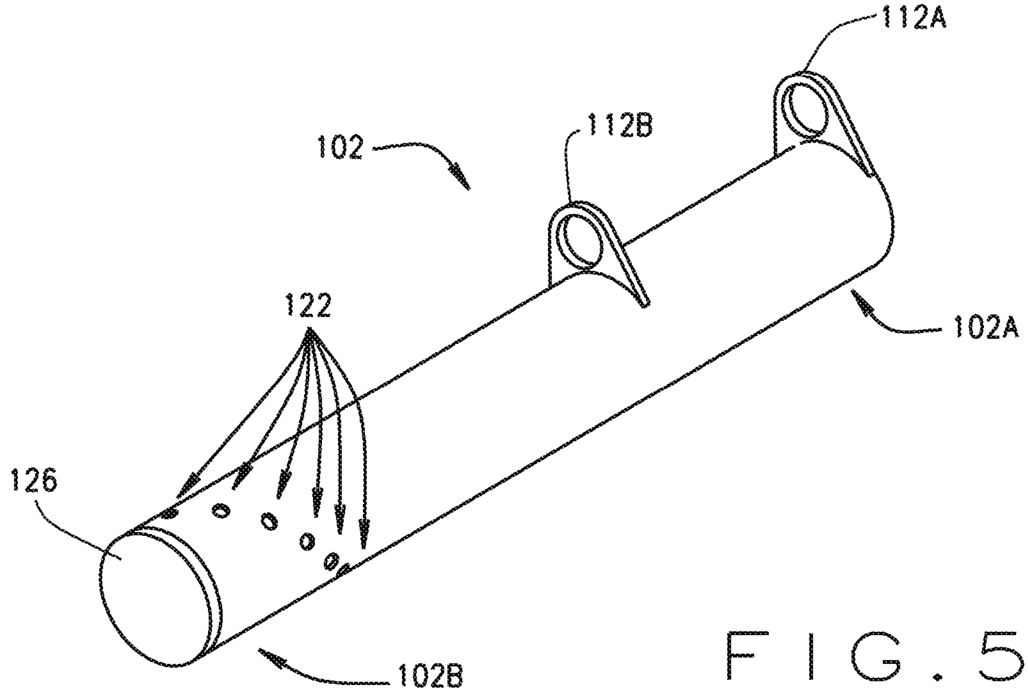
FIG. 5 is a perspective view of the outer tube of the directional fluid conduit heat control system of FIG. 1, with no nipples attached.

Referring now to FIG. 5, the outer tube 102 is constructed of steel (or a similar rigid material capable of withstanding temperatures in excess of 1000 degrees F. without substantial deflection). The outer tube 102 is approximately 30 feet long, and has a uniform outer diameter of approximately 24 inches with a uniform inner diameter of approximately 23 inches, and has a proximal end 102A and an opposing distal end 102B. The outer tube 102 has a set of seven orifices shaped as round through bores 122 formed in a helical arc along one side of the tube. The through bores 122 are each approximately 8 inches in diameter, and the center-to-center separation between neighboring bores 122 is approximately 14 inches. The first of the bores 122 is positioned approximately 12 inches from the distal end 102B. That is, the bores 122 extend in a helical fashion along one side of the outer tube 102, from a point approximately 12 inches from the distal end 102B toward the proximal end 102A, for a total longitudinal length of approximately 9 feet.

Figure 7:
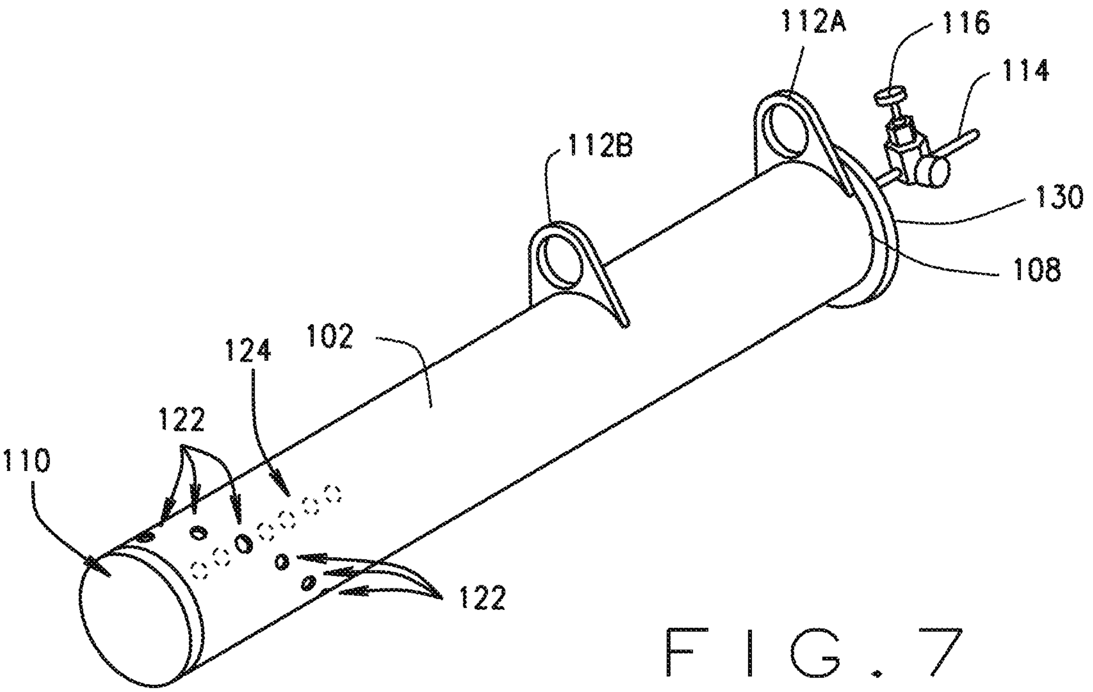
FIG. 7 is a perspective view of the tubes of the directional fluid conduit heat control system of FIG. 1, having the system's inner tube positioned inside the outer tube, where the outer tube is rotated to a first orientation relative to the inner tube, and showing the inner tube bores juxtaposed in phantom lines under the outer tube.
Figure 8:
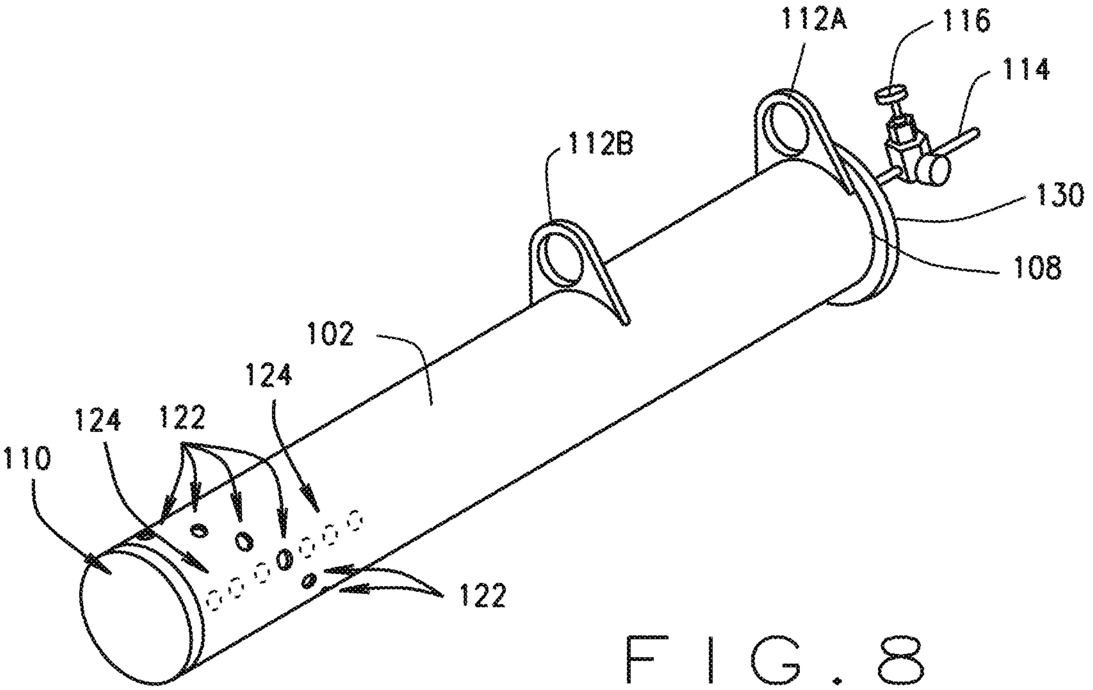
FIG. 8 is a perspective view of the tubes of the directional fluid conduit heat control system of FIG. 1, having the system's inner tube positioned inside the outer tube, where the outer tube is rotated to a second orientation relative to the inner tube, and showing the inner tube bores juxtaposed in phantom lines under the outer tube.
Figure 9:
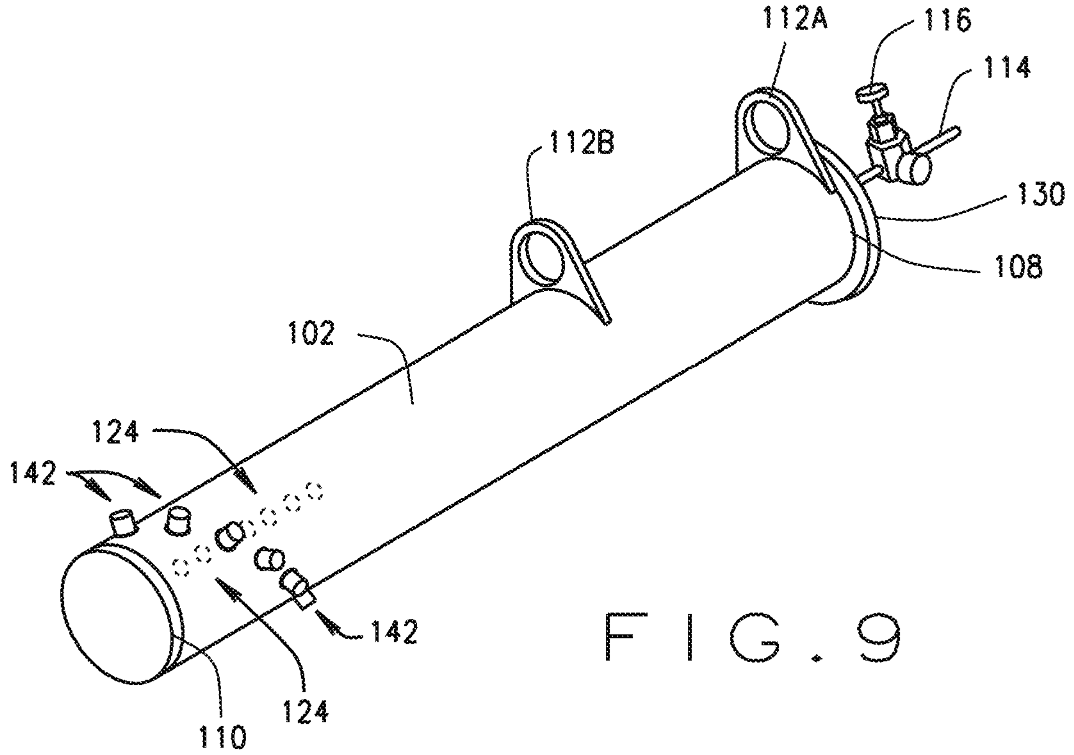
FIG. 9 is a partial phantom perspective view of the tubes of FIG. 7, with directional nipples extending radially outward from the bores of the outer tube.
Figure 10:
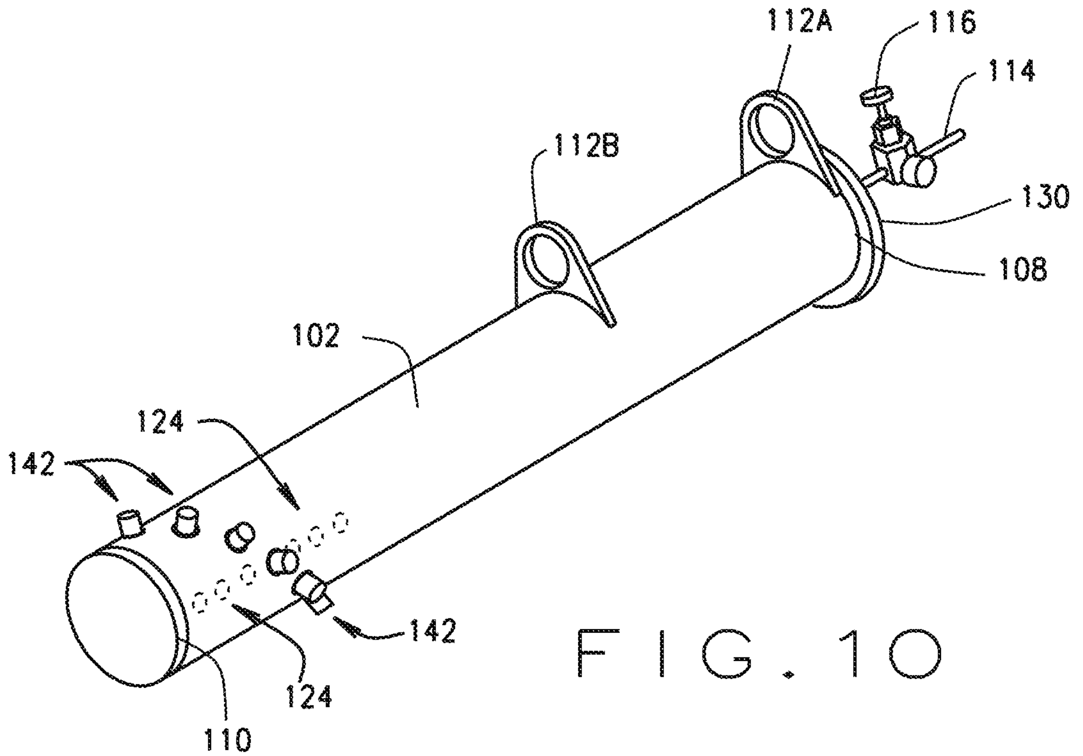
FIG. 10 is a partial phantom perspective view of the tubes of FIG. 8, with directional nipples extending radially outward from the bores of the outer tube.

Referring to FIGS. 5 and 7, it can be seen that the mounting bracket 112A is rotatably secured to the outer surface of the outer tube 102 near the proximal end 102B. Similarly, mounting bracket 112B is rotatably secured to the outer surface of the outer tube 102 approximately five feet from the proximal end 102A. The mounting brackets 112A and 112B are parallel and uniformly oriented relative to the axis X. The mounting brackets 112A and 112B secure the electric motor 106 to the top of the outer surface of the outer tube 102. A set of gears (not shown) link the shaft of the motor 106 to the proximal end 104A of the tube 104 to enable the motor 106 to engage and rotate the tube 104 within the tube 102.

Figure 6:
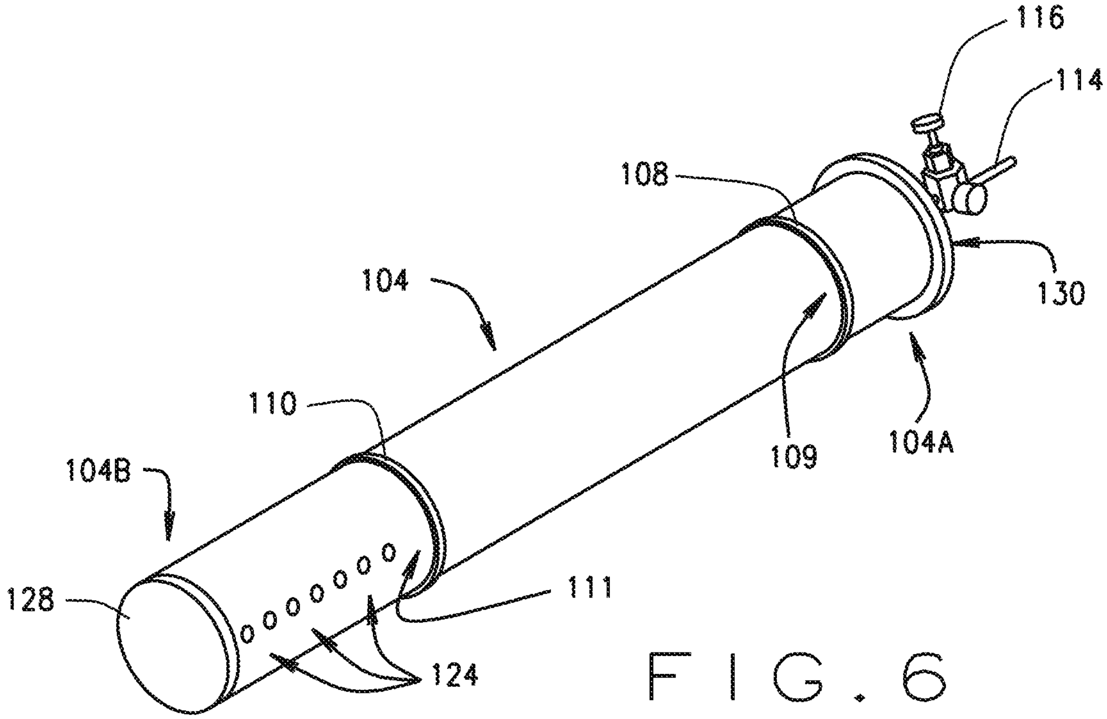
FIG. 6 is a perspective view of the inner tube of the directional fluid conduit heat control system of FIG. 1, attached at the inlet end to a gas regulator.

Referring now to FIG. 6, the inner tube 104 is also constructed of steel (or a similar rigid material capable of withstanding temperatures in excess of 1000 degrees F. without substantial deflection). The inner tube 104 is approximately 30 feet long, and has a uniform outer diameter of just under 23 inches with a uniform inner diameter of just under 22 inches, and has a proximal end 104A and an opposing distal end 104B. The inner tube 104 also has a set of seven orifices shaped as round through bores 124 formed in a straight longitudinal line along the side of the tube. The through bores 124 are each approximately 8 inches in diameter, and mimicking the bores 122 in the outer tube 102, the axial center-to-center separation between neighboring bores 124 is approximately 14 inches. The first of the bores 124 is positioned approximately 12 inches from the distal end 104B. That is, the bores 124 extend along one side of the inner tube 104, from a point approximately 12 inches from the distal end 104B toward the proximal end 104A, for a total longitudinal length of approximately 9 feet.

The outer tube 102 has a first endplate 126 that is secured to and gaseously seals the distal end 102B. The first endplate 126 is approximately 0.5 inches thick, substantially flat and circular, and has an outer perimeter that does not extend beyond the outer perimeter of the outer tube 102. The inner tube 104 has a second endplate 128 that is secured to and gaseously seals the distal end 104B. The endplate 128 is approximately 0.5 inches thick, substantially flat and circular, and has an outer perimeter that does not extend beyond the outer perimeter of the inner tube 104. The inner tube 104 also has a third endplate 130 that is secured to and gaseously seals the proximal end 104A. The endplate 130 is approximately 0.5 inches thick, substantially flat and circular, and has an outer perimeter that extends approximately 1 inch beyond the outer perimeter of the inner tube 104. The length between the distal end 104B of the tube 104 and the inner face of the plate 130 is such that the plate 130 prevents the inner tube 104 from either contacting the inner face of the plate 126 of the outer tube 102, or pressing so hard against the plate 126 as to inhibit the rotation of the inner tube 104 within the outer tube 102. Either way, the system 100 is designed to allow the inner tube 104 to rotate within the outer tube 102.

Referring to FIG. 6, it can be seen that the first and second rotary shaft bushings 108 and 110, which are positioned between the outer tube 102 and the inner tube 104, are configured to allow the inner tube 104 to rotate within the outer tube 102, but are also configured to act as gas seals to prevent the leakage of pressurized gas(es) from between the inner tube 102 and the outer tube 104. These bushings 108 and 110 are constructed of materials capable of functioning properly within the tubes 102 and 104 at temperatures ranging from room temperature to temperatures in excess of 1000 degrees F. The first rotary bushing 108 is positioned in a radial groove 109 in the outer surface of the inner tube 104 near the proximal end 104A, such that it encircles the inner tube 104 and presses against the inner surface of the outer tube 102 near the proximal end 102A. Similarly, the second rotary bushing 110 is positioned in a radial groove 111 in the outer surface of the inner tube 104 near the first of the bores 124, such that it encircles the inner tube 104 and presses against the inner surface of the outer tube 102 near the distal end 102B. In this way, the bushings 108 and 110 assist in the rotation of the inner tube 104 within the outer tube 102 while allowing the distal end 104B to rotate inside the distal end 102B with the outer surface of the inner tube 104 engaging the inner surface of the outer tube 102 along the lengths of the bores 122 and 124, such that there is little to no gap between the tubes in the vicinity of the bores 122 and 124 through which pressurized gas from the inner tube 104 can escape.

As can be understood by one of ordinary skill in the art, when properly assembled as depicted in the Figures, the inner tube 104 is longitudinally and coaxially positioned inside the outer tube 102 such that the distal ends 102B and 104B substantially coincide with each other but with a slight radial separation, while the proximal end 104A of the inner tube 104 extends slightly outward from the proximal end 102A of the outer tube 102.

When the inner tube 104 is thus positioned properly and fully within the outer tube 102 (as shown in FIGS. 1-4), each of the bores 124 in the inner tube 104 aligns in a longitudinal orientation parallel to the axis X with one of the bores 122 in the outer tube 102. However, the arcuate displacement of each of the bores 122 relative to its nearest bore 122 on either side is just over 8 inches. Consequently, because the bores 122 track along a helical arc, only one of the bores 124 will fully align with a respective bore 122 at any one time. Thus, as can be appreciated, by using the motor 106 to controllably rotate the inner tube 104 within the outer tube 102, a user can selectively align a particular bore 124 with its corresponding bore 122, or can partially align two neighboring bores 122 with their corresponding bores 124.

A gas port 132 (see FIGS. 1-4) is positioned on and penetrates the plate 130 at the proximal end 104A of the inner tube 104. The gas port 132 attaches to the gas supply line 114 that provides pressurized gas of known and/or controlled temperature and pressure and flow to the gas port 132. The gas port 132 thereby supplies pressurized gas to the interior of the inner tube 104, and the pressurized gas then exits the inner tube 104, through the aligned bore(s) 124 and 122, to be directed by corresponding nipple(s) 142 attached to the outside of each of the bores 122 in the outer tube 102. The nipples 142 provide additional directional control to the gas flow from the bores 122 in outer tube 102.

The tubes 102 and 104 are supported by the stand 118 in a generally horizontal orientation that is substantially coaxial with the axis X, with the outer tube 102 being inserted into the kiln 12 through an opening 134 in the outlet end 16 of the rotary kiln 12. In this way, when the directional fluid conduit heat control system 100 is properly assembled as shown, the tubes 102 and 104 are collectively extended from outside the kiln 12 through the outlet end 16 and into the kiln 12 in a cantilevered fashion.

Moreover, the tube 104 is secured to the cart 120 that is operatively attached to the rails 119, which are mounted on the stand 118. The cart 120 has a set of wheels 140 that enable the cart 120 to travel along the rails 119 inward toward the furnace kiln 12 and outward away from the kiln 12, in a direction substantially parallel to the axis X, to move the tubes 102 and 104 into and out of the kiln 12. The cart 120 is motorized and can be operatively connected to a computer to automatically control, e.g., the position of the cart 120 along the rails 119, and the speed at which the cart 120 moves along the rails 119, as well as the period of time that the cart 120 (and thus, the tubes 102 and 104) are in any particular longitudinal position. The cart 120 can thus be used to control the location of the tubes 102 and 104, and thus the bores 122 and 124 within the kiln 12 at any given time, as well as the dwell times that bores 122 and 124 are located at any particular position in the kiln 12.

A user-programmable computer control system ("CCS", not shown) operates each of the operative components of the directional fluid conduit heat control system 100. The CCS receives input from various process sensors. For example, a temperature probe 300 shown in FIGS. 2-3, includes a set of 5 temperature sensors 302 positioned in 5 separate zones along the length of the kiln 12 that generate electronic signals indicative of the temperatures in those 5 zones. In addition, the gas regulator 116 positioned in the gas supply line 114 includes a sensor that detects the temperature and pressure and flow rate of pressurized gas flowing through the regulator 116 into the inner tube 104, and generates electronic signals indicative of the temperature and pressure and flow rate. The CCS collects and uses these electronic signals from one or more of the sensors 302 and the regulator 116, in association with a user-programmable computer code to operate the automated gas regulator 116 to controllably regulate the pressure and flow of gas from the gas line 114 into the inner tube 102 in response to one or more of the sensors' electronic signals. Thus, the CCS can be programmed to allow the user to selectively control the amount of gas entering the kiln 12 through the system 100 based upon selectable operational conditions in the furnace 10 and/or the in the kiln itself.

In addition, the CCS operates the electric drive motor 106. That is, user-programmable computer code programmed into the CCS utilizes electronic signals from various system sensors, such as for example electronic signals from one or more of the sensors 302 and the regulator 116, to automatically activate the electric drive motor 106 to controllably co-axially rotate the inner tube 104 within the outer tube 102 to automatically orient a desired bore 124 with a desired bore 122 to selectively direct pressurized gas from the inner tube 104 into a desired location in the kiln 12, in response to one or more of the sensors' electronic signals. The computer code can also be selectively programmed to rotate the inner tube 104 at predetermined speeds for time periods—in response to the operational conditions detected throughout the furnace 10 and/or the kiln 12.

Further, the CCS operates an electric drive motor (not shown) that urges the cart 120 forward or backwards along the rails 119. Positional sensors proximate the cart 120 (not shown) generate electronic signals indicative of the position and rate of travel of the cart 120 along the rails 119. The CCS receives these electronic signals and a user-programmable computer code in the CCS utilizes one or more of these electronic signals, to automatically activate and/or deactivate the operation of the drive motor attached to the cart 120, to controllably urge the cart 120 toward the kiln 12 or away from the kiln 12 at a particular rate of travel, in response to the electronic signals.

Thus, as one of ordinary skill in the art will recognize, when the directional fluid conduit heat control system 100 is fully assembled and positioned in place in a kiln, such as the kiln 12, the CCS enables the furnace operator to preprogram computer code to operate the system 100 in a fully automated fashion. More particularly, aluminum feed material or scrap which is ready for the delacquering process (or the zones in the kiln 12 containing the scrap) can be controllably sprayed or doused at specific periods of time and at desired locations in the kiln 12 with gases from the bores 122 of the outer tube 102 as the scrap travels through the kiln 12. Moreover, as can be seen from the drawings and readily understood by one of ordinary skill in the art, rotating the inner tube 104 within the outer tube 102 uniquely orients each of the bores 124 with a longitudinally corresponding bore 122 at a particular axial rotation. Thus, the operator or the CCS can selectively choose which of the bores 124 of the inner tube 104 align with—and therefore open to—which bores 122 of the outer tube 102. In this way, the operator/CCS can selectively direct the gases from the system 100 through select bores 122 along the length of the outer tube 102 to douse the material in the furnace kiln 12, so as to either cool or add heat to the material being doused with the gases in a manner that controls the timing and location of the dousing within the kiln 12. The CCS can also controllably position the longitudinal location of the tubes 102 and 104 inside the kiln 12 by controlling the movement of the cart 120. Moreover, the CCS can control the dwell time for the tubes 102 and 104 to be in any particular longitudinal position along the axis X.

Figure 11:
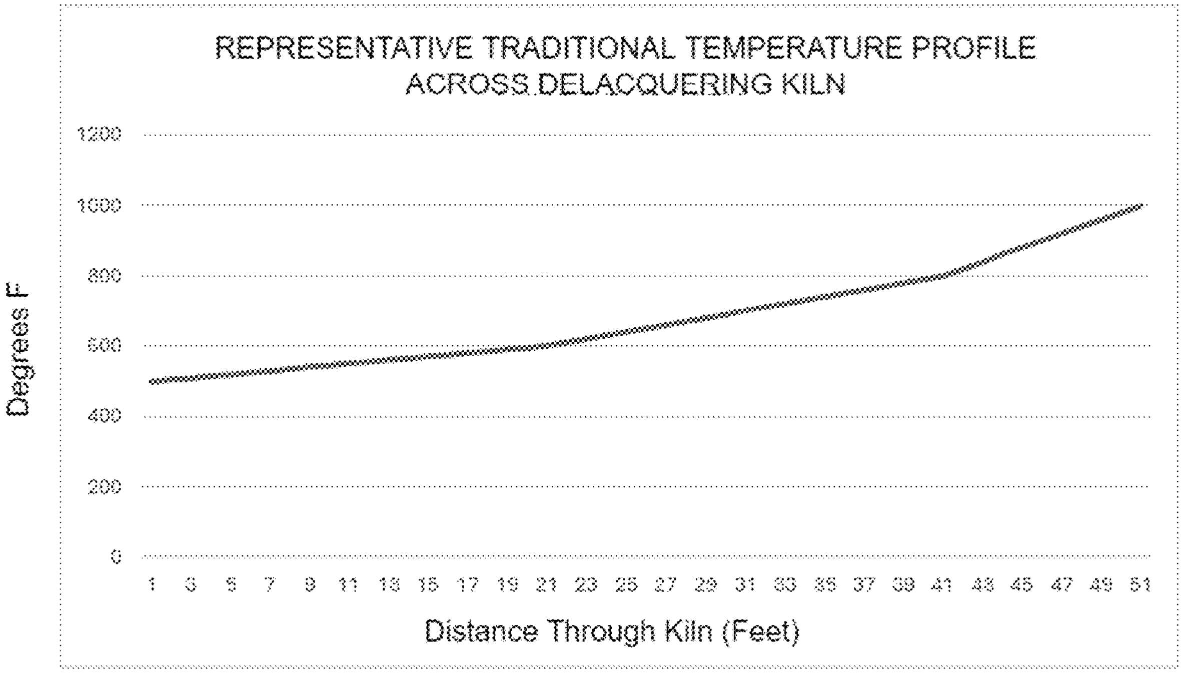
FIG. 11 is a graph of temperature vs. distance of a representative traditional temperature profile across a delacquering kiln.
Figure 12:
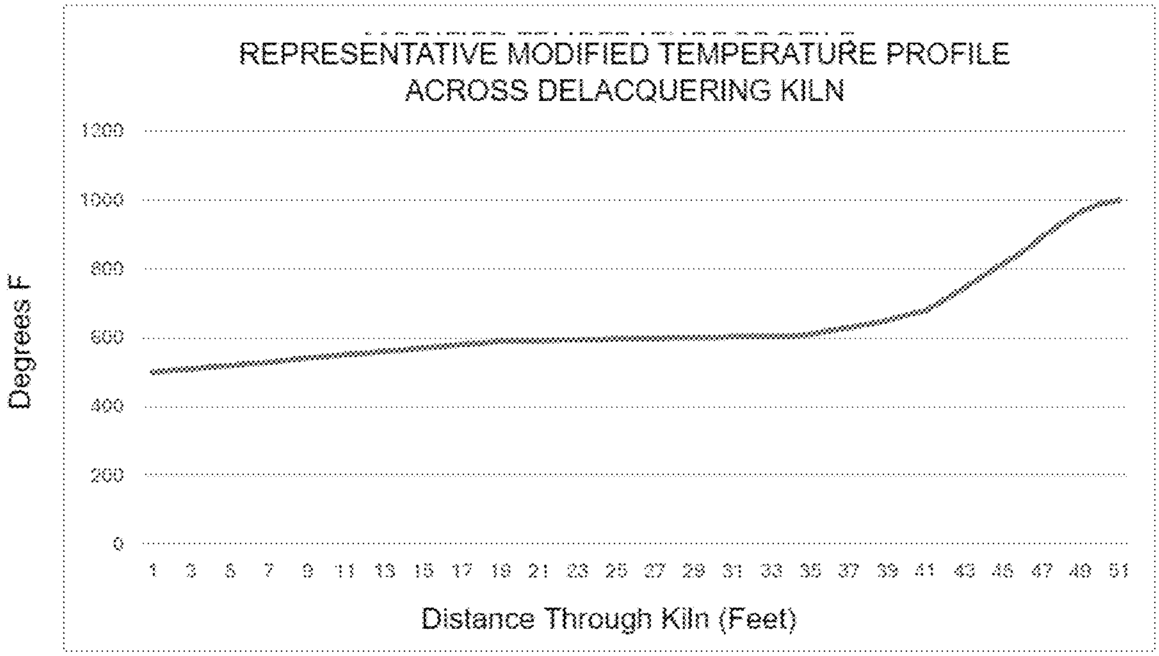
FIG. 12 is a graph of temperature vs. distance of a representative modified temperature profile across a delacquering kiln.

Thus, the system 100 is designed to inject additional process gas into a desired section or zone of the kiln 12 to modify the kiln's temperature profile by selectively retarding or raising the temperature in some regions of the kiln 12. For a delacquering furnace configuration, this allows the furnace 10 operator to extend the process material's dwell time in the temperature area where the VOC volatilizes to allow for proper chemical reactions. This is shown graphically in the representative comparison temperature profile curves of FIGS. 11-12, where it can be seen that the temperature profile can be "flattened" across the center length of the kiln 12 by using the system 100 to modify the temperatures in the kiln 12. Moreover, the process material in the kiln 12 can then take on a greater thermal head as those materials move through the kiln 12 from the inlet end 14 toward the outlet end 16. This means that the kiln 12 can operate the incoming process gases hotter than would traditionally be feasible. That is, the process material (scrap aluminum) in the kiln 12 will not be in the process gases long enough to reach the aluminum's phase change as use of the system 100 as described can delay heating the process material (scrap aluminum) in the kiln 12, allowing for extra energy to be absorbed by the process material.

Additional variations or modifications to the configuration of the above-described novel directional fluid conduit heat control system 100 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

For example, so long as the system 100 can operate generally as described hereinabove, the system 100 can vary from the embodiments already described herein, such that the system 100 can be configured to have:

a. more or less than two rotary bushings 108, 110, and the bushings 108 and 110 can be located at different positions on the tubes 102 and 104, or none at all;

b. one or both of the bushings 108 and/or 110 positioned in grooves in the inner surface of the outer tube 102;

c. the bushings 108 and/or 110 can be replaced with alternative devices, such as for example, bearings;

d. more or less than the seven bores 122 and/or the seven bores 124;

e. different and/or non-uniform spacings between each of the bores 122 and/or each of the bores 124;

f. a different pattern for the bores 122 other than the specific helix as disclosed in the Figures;

g. different dimensions for each of the tubes 102 and 104, such as for example different lengths, radii and wall thicknesses;

h. with different patterns for the bores 122 and 124—that is, for example, the bores 122 being generally straight, while the bores 124 are oriented in a helical pattern;

i. different diameters for any one or more of the bores 122 and/or 124;

j. the bores 122 and 124 sized and positioned such that for a given rotational alignment between the tube 102 and the tube 104, more than a single bore 122 can align with a corresponding bore 124—that is, for example, the tubes 102 and 104 can have a series of stepped bores, or can have a middle bore 124 open to its respective bore 122 with side bores 124 on each side partially open to corresponding bores 122;

k. any one or more of the bores 122 and 124 replaced with an opening or opening(s) of any of a variety of shapes and sizes, including for example slots, squares, rectangles, triangles, ovals, and irregular shapes, etc.;

l. the tubes 102 and 104 at least in part longitudinally taper in diameter;

m. the tubes 102 and 104 insert into the inlet 14 of the kiln 12;

n. a heating and/or cooling system to controllably regulate the temperature of the fluids being supplied to the system 100, where such a system can be configured to be controlled by the CCS;

o. nipples 142 that are curved, tapered and/or turned in a particular direction;

p. nipples 142 that are directionally adjustable;

q. the bores 122 and 124 oriented along the tubes 102 an 104 such that the nipples 142 point in one or more directions other than what is shown in the Figures, such as for example having the nipples 142 generally directed downward;

r. the tubes 102 and 104 positioned in the kiln 12 in a manner or orientation different from that shown in the Figures, such as for example, the tubes 102 and 104 can be positioned higher or lower than the axis X, to one side or the other of the axis X, or at an angle in which the axes of the tubes are not parallel with the axis X;

s. the gas regulator 116 be manually operated;

t. the gas regulator 116 replaced with a butterfly control valve, or with a fluid regulator if fluids other than gasses are utilized by the system 100;

u. a lip, lug or other construct positioned along the tube 104, that replaces the lip of plate 130, to limit how far the tube 104 can be inserted into the tube 102;

v. the motor 106 positioned differently than shown—for example, the motor 106 can be positioned on the cart 120 or at a different location on the outer tube 102;

w. any of a variety of other drive mechanisms in place of the motor 106, such as for example, a pneumatic or hydraulic drive system;

x. a motor or a pneumatic system that is configured to rotate the outer tube 102 about the inner tube 104;

y. more than one drive motor or pneumatic system to rotate one or both of the tubes 102 and 104 about their central axes;

z. one or more various seals strategically positioned in or about the tubes 102 and/or 104 to ensure that the pressurized fluid in tube 104 does not leak and/or "bleed" into the tube 102, such as for example fluid seals positioned about individual bores 122 and/or 124 that prevent fluid leaks around those bores between the tubes 102 and 104; and aa. a gas fan with insulated ductwork in place of the gas regulator 116, where the fan can be regulated to control the flow and/or pressure of gas, such as hot air, into the tube 104.

Moreover, the tubes 102 and 104 are not limited to a circular cross-section, but can have differing cross-sectional shape. For example, the tubes could each be rectangular or oval in cross-sectional shape. However, for any cross-sectional shapes that are not circular, the inner tube 104 may not be able to axially rotate within the outer tube 104. In such circumstances, the inner tube 104 will need to be pushed partially into and pulled partially out of the outer tube 102 in an axially or longitudinal manner so as to selectively align one or more of the bores 122 with one or more of the bores 124 in order to achieve the same benefits as outlined herein.

Further, although the system 100 as disclosed is configured to controllably inject a gas into the kiln 12, it is contemplated that the system 100 can be readily adapted to dispense a pressurized fluid, other than a gas, through the tubes 102 and 104, and through the bores 122 and 124. Such fluids may, for example, include any one or more of various liquids such as water, various coolants, and various oils. Thus, the directional fluid conduit heat control system 100 can therefore be used as a delivery method for the injection of, for example, various chemical reagents and/or oxidizers that can attack the coatings or address chemical pollution concerns.

While I have described in the detailed description a configuration that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel directional gas conduit heat control system 100 of the present invention can be arranged in a number of other and related varieties of configurations without expanding beyond the scope of my invention as set forth in the claims.

What is claimed is:

1. A directional fluid heat control system for a high temperature furnace, said furnace having a kiln, said kiln having an inlet for the introduction of process material and an outlet for the removal of said process material and a process zone there between, said directional fluid heat control system comprising:

a. a substantially rigid elongated first fluid conduit, said first fluid conduit having at least two outer orifices positioned along its longitudinal length, said first fluid conduit having a longitudinal central axis, said first fluid conduit being positionable at least in part in said kiln and oriented such that at least one of said at least two outer orifices is positioned in said kiln and directed toward said kiln process zone when said first fluid conduit is positioned in said kiln; and b. a substantially rigid elongated second fluid conduit, said second fluid conduit receiving pressurized fluid from a fluid source, said second fluid conduit having at least two inner orifices positioned along its longitudinal length, said second fluid conduit being positioned at least in part inside said first fluid conduit in a substantially longitudinally coaxial manner relative to said central axis;

wherein one of said first and second fluid conduits is movable between a first and a second rotational orientation about said central axis relative to the other of said first and second fluid conduits, a first of said at least two inner orifices aligning at least in part with a first of said at least two outer orifices while a second of said at least two inner orifices does not align with any of said at least two outer orifices when said one of said first and second fluid conduits is in said first rotational orientation, and said second of said at least two inner orifices aligning at least in part with a second of said at least two outer orifices while said first of said at least two inner orifices does not align with any of said at least two outer orifices when said one of said first and second fluid conduits is in said second rotational orientation.

2. The directional fluid heat control system of claim 1, wherein a portion of one of said first and second fluid conduits is tubular.

3. The directional fluid heat control system of claim 1, wherein a portion of one of said two or more inner orifices and said two or more outer orifices is positioned on its respective fluid conduit in one of: (i) a generally straight substantially longitudinal line; (ii) a generally straight laterally arcuate line; (iii) a generally staggered orientation; and (iv) a generally helical pattern.

4. The directional fluid heat control system of claim 1, further comprising a fluid regulator, said fluid regulator controlling one of a flow rate and a pressure and a temperature of said pressurized fluid provided to said second fluid conduit.

5. The directional fluid heat control system of claim 1, wherein said first fluid conduit is movable from a first position in which said first fluid conduit is positioned at least in part in said kiln and a second position separated from said first position.

6. The directional fluid heat control system of claim 5, further comprising a longitudinal drive, said longitudinal drive being operatively attached to and controllably urging said first fluid conduit between said first and second positions.

7. The directional fluid heat control system of claim 1, further comprising a rotational drive, said rotational drive being operatively attached to one of said first and second fluid conduits and controllably rotating said one of said first and second fluid conduits about said central axis relative to the other of said first and second fluid conduits.

8. The directional fluid heat control system of claim 1, wherein said pressurized fluid comprises pressurized gas from a gas source.

9. The directional fluid heat control system of claim 1, further comprising a user-programmable computer control system operatively associated with one of said first and second fluid conduits and an operation sensor operatively associated with said computer control system, said operation sensor detecting an operating condition in said kiln and generating a first electronic signal indicative of said operating condition, said computer control system receiving said first electronic signal and manipulating the rotation of said one of said first and second fluid conduits about said central axis based at least in part on said first electronic signal.

10. The directional fluid heat control system of claim 9, wherein said operating condition comprises one of temperature, heat, process material push rate, and fluid flow rate.

11. The directional fluid heat control system of claim 1, further comprising a user-programmable computer control system operatively associated with one of said first and second fluid conduits and a fluid sensor operatively associated with said computer control system, said fluid sensor detecting a condition of fluid being supplied to one of said first and second fluid conduits and generating a first electronic signal indicative of said fluid condition, said computer control system receiving said first electronic signal and manipulating the rotation of said one of said first and second fluid conduits about said central axis based at least in part on said first electronic signal.

12. The directional fluid heat control system of claim 11, wherein said fluid condition comprises one of fluid temperature, fluid pressure and fluid flow rate.

13. The directional fluid heat control system of claim 12, wherein said computer control system is operatively associated with a fluid regulator, said fluid regulator controlling one of a flow rate and a pressure and a temperature of said pressurized fluid provided to said second fluid conduit, said computer control system manipulating the operation of said fluid regulator based at least in part on said first electronic signal.

14. The directional fluid heat control system of claim 1, wherein one of said two or more inner orifices in said first fluid conduit and said two or more orifices in said second fluid conduit comprises a through bore.

15. A directional fluid heat control system for a high temperature furnace, said furnace having a kiln, said kiln having an inlet for the introduction of process material and an outlet for the removal of said process material and a process zone there between, said directional fluid heat control system comprising:

a. a substantially rigid elongated first fluid conduit, said first fluid conduit having at least two outer orifices positioned along its longitudinal length, said first fluid conduit having a longitudinal central axis, said first fluid conduit being positionable at least in part in said kiln and oriented such that at least one of said at least two outer orifices is positioned in said kiln and directed toward said kiln process zone when said first fluid conduit is positioned in said kiln; and b. a substantially rigid elongated second fluid conduit, said second fluid conduit receiving pressurized fluid from a fluid source, said second fluid conduit having at least two inner orifices positioned along its longitudinal length, said second fluid conduit being positioned at least in part inside said first fluid conduit in a substantially longitudinally manner generally parallel to said central axis;

wherein one of said first and second fluid conduits is movable from a first longitudinal orientation generally parallel to said central axis relative to the other of said first and second fluid conduits and a second longitudinal orientation generally parallel to said central axis relative to the other of said first and second fluid conduits, a first of said at least two inner orifices aligning at least in part with a first of said at least two outer orifices while a second of said at least two inner orifices does not align with any of said at least two outer orifices when said one of said first and second fluid conduits is in said first longitudinal orientation, and said second of said at least two inner orifices aligning at least in part with a second of said at least two outer orifices while said first of said at least two inner orifices does not align with any of said at least two outer orifices when said one of said first and second fluid conduits is in said second rotational orientation.

16. The directional fluid heat control system of claim 15, wherein a portion of one of said first and second fluid conduits is tubular.

17. The directional fluid heat control system of claim 15, wherein a portion of one of said two or more inner orifices and said two or more outer orifices is positioned on its respective fluid conduit in one of: (i) a generally straight substantially longitudinal line; (ii) a generally straight laterally arcuate line; (iii) a generally staggered orientation; and (iv) a generally helical pattern.

18. The directional fluid heat control system of claim 15, further comprising a fluid regulator, said fluid regulator controlling one of a flow rate and a pressure of said pressurized fluid provided to said second fluid conduit.

19. The directional fluid heat control system of claim 15, wherein said first fluid conduit is movable from a first position in which said first fluid conduit is positioned at least in part in said kiln and a second position separated from said first position.

20. The directional fluid heat control system of claim 19, further comprising a longitudinal drive, said longitudinal drive being operatively attached to and controllably urging said first fluid conduit between said first and second positions.

21. The directional fluid heat control system of claim 15, further comprising a conduit drive, said conduit drive being operatively attached to one of said first and second fluid conduits and controllably urging said one of said first and second fluid conduits between said first and second longitudinal orientations relative to the other of said first and second fluid conduits.

22. The directional fluid heat control system of claim 15, wherein said pressurized fluid comprises pressurized gas from a gas source.

23. The directional fluid heat control system of claim 15, further comprising a user-programmable computer control system operatively associated with one of said first and second fluid conduits and an operation sensor operatively associated with said computer control system, said sensor detecting an operating condition in said kiln and generating a first electronic signal indicative of said operating condition, said computer control system receiving said first electronic signal and manipulating the longitudinal orientation of said one of said first and second fluid conduits relative to the other based at least in part on said first electronic signal.

24. The directional fluid heat control system of claim 23, wherein said operating condition comprises one of temperature, heat, process material push rate, and gas flow rate.

25. The directional fluid heat control system of claim 15, wherein one of said two or more inner orifices in said first fluid conduit and said two or more orifices in said second fluid conduit comprises a through bore.

26. A directional fluid heat control system for a high temperature furnace, said furnace having a kiln, said kiln having an inlet for the introduction of process material and an outlet for the removal of said process material and a process zone there between, said directional fluid heat control system comprising:

c. a substantially rigid elongated tubular first fluid conduit, said first fluid conduit having a longitudinal central axis, said first fluid conduit having a plurality of outer orifices positioned along its longitudinal length, said first fluid conduit being positionable at least in part in said kiln and oriented such that at least one of said plurality of outer orifices is positioned in said kiln and directed toward said kiln process zone when said first fluid conduit is positioned in said kiln, a portion of said plurality of outer orifices forming one of: (i) a generally straight substantially longitudinal line; (ii) an arcuate line; (iii) a generally staggered orientation; and (iv) a generally helical pattern; and d. a substantially rigid elongated tubular second fluid conduit, said second fluid conduit receiving pressurized fluid from a fluid source, said second fluid conduit being positioned at least in part inside said first fluid conduit in a substantially longitudinally coaxial manner relative to said central axis, said second fluid conduit having a plurality of inner orifices positioned along its longitudinal length, a portion of said plurality of inner orifices forming one of: (i) a generally straight substantially longitudinal line; (ii) an arcuate line; (iii) a generally staggered orientation; and (iv) a generally helical pattern;

wherein one of said first and second fluid conduits is movable between a first and a second rotational orientation about said central axis relative to the other of said first and second fluid conduits, a first of said plurality of inner orifices aligning at least in part with a first of said plurality of outer orifices while a second of said plurality of inner orifices does not align with any of said plurality of outer orifices when said one of said first and second fluid conduits is in said first rotational orientation.

27. The directional fluid heat control system of claim 26, wherein said second of said plurality of inner orifices aligns at least in part with a second of said plurality of outer orifices and said first of said plurality of inner orifices does not align with any of said plurality of outer orifices when said one of said first and second fluid conduits is in said second rotational orientation.

28. The directional fluid heat control system of claim 26, further comprising a fluid regulator, said fluid regulator controlling one of a flow rate and a pressure of said pressurized fluid provided to said second fluid conduit.

29. The directional fluid heat control system of claim 26, wherein said first fluid conduit is movable from a first position in which said first fluid conduit is positioned at least in part in said kiln and a second position separated from said first position.

30. The directional fluid heat control system of claim 29, further comprising a longitudinal drive, said longitudinal drive being operatively attached to and controllably urging said first fluid conduit between said first and second positions.

31. The directional fluid heat control system of claim 26, further comprising a rotational drive, said rotational drive being operatively attached to one of said first and second fluid conduits and controllably rotating said one of said first and second fluid conduits about said central axis relative to the other of said first and second fluid conduits.

32. The directional fluid heat control system of claim 26, wherein said pressurized fluid comprises pressurized gas from a gas source.

33. The directional fluid heat control system of claim 26, further comprising a user-programmable computer control system operatively associated with one of said first and second fluid conduits and an operation sensor operatively associated with said computer control system, said operation sensor detecting an operating condition in said kiln and generating a first electronic signal indicative of said operating condition, said computer control system receiving said first electronic signal and manipulating the rotation of said one of said first and second fluid conduits about said central axis based at least in part on said first electronic signal.

34. The directional fluid heat control system of claim 33, wherein said operating condition comprises one of temperature, heat, process material push rate, and fluid flow rate.

35. The directional fluid heat control system of claim 26, wherein one of said plurality of inner orifices in said first fluid conduit and said plurality of orifices in said second fluid conduit comprises a through bore.

* * * * *